(12) United States Patent
Kral et al.

(10) Patent No.: US 11,628,749 B2
(45) Date of Patent: Apr. 18, 2023

(54) VEHICLE SEAT FOR A MOTOR VEHICLE AND METHOD OF POSITIONING THE SAME

(71) Applicant: GM Global Technology Operations LLC, Detroit, MI (US)

(72) Inventors: Jiri Kral, Troy, MI (US); Lisa Furton, Beverly Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 485 days.

(21) Appl. No.: 16/802,096

(22) Filed: Feb. 26, 2020

(65) Prior Publication Data

US 2021/0261021 A1    Aug. 26, 2021

(51) Int. Cl.
| | | |
|---|---|---|
| B60N 2/02 | (2006.01) | |
| B60N 2/10 | (2006.01) | |
| G08B 21/18 | (2006.01) | |

(52) U.S. Cl.
CPC ......... *B60N 2/0244* (2013.01); *B60N 2/0232* (2013.01); *B60N 2/0284* (2013.01); *B60N 2/10* (2013.01); *G08B 21/18* (2013.01); *B60N 2002/0272* (2013.01)

(58) Field of Classification Search
CPC ... B60N 2/0244; B60N 2/0232; B60N 2/0284
See application file for complete search history.

(56) References Cited

U.S. PATENT DOCUMENTS

| | | |
|---|---|---|
| 3,464,736 A | 9/1969 | Mizelle |
| 3,591,232 A | 7/1971 | Simon |
| 3,998,291 A | 12/1976 | Davis |
| 4,636,002 A | 1/1987 | Genjiro |
| 4,898,424 A | 2/1990 | Bell |
| 5,125,472 A | 6/1992 | Hara |
| 5,611,601 A | 3/1997 | Cowgur |
| 5,707,112 A | 1/1998 | Zinn |
| 5,746,467 A | 5/1998 | Jesadanont |
| 5,810,417 A | 9/1998 | Jesadanont |
| 5,823,627 A | 10/1998 | Viano et al. |
| 5,887,970 A | 3/1999 | Payne |
| 5,971,467 A | 10/1999 | Kayumi et al. |

(Continued)

FOREIGN PATENT DOCUMENTS

| | | |
|---|---|---|
| DE | 19951120 A1 | 5/2001 |
| DE | 102016215805 A1 | 3/2018 |
| DE | 102016220997 A1 | 4/2018 |

*Primary Examiner* — Syed A Islam
(74) *Attorney, Agent, or Firm* — Vivacqua Crane, PLLC

(57) ABSTRACT

A vehicle seat for a motor vehicle includes a seat bottom and a seatback displaceable relative to one another. A seat positioning system has an actuator for displacing one of the seat bottom and the seatback toward the other of the seat bottom and the seatback. The system further includes a position sensor for generating a seat position signal indicative of a position of one of the seat bottom and the seatback relative to the other of the seat bottom and the seatback. The system further includes a controller for generating an activation signal in response to the controller determining that the position is above the position threshold. The actuator displaces one of the seat bottom and the seatback toward the other of the seat bottom and the seatback in response to the actuator receiving the activation signal from the controller.

18 Claims, 5 Drawing Sheets

(56) References Cited

U.S. PATENT DOCUMENTS

| | | | |
|---|---|---|---|
| 6,076,856 | A | 6/2000 | Wang et al. |
| 6,227,563 | B1 | 5/2001 | Talisman |
| RE37,928 | E | 12/2002 | Howard |
| 6,805,403 | B2 | 10/2004 | Buch |
| 6,813,562 | B2 | 11/2004 | Altan et al. |
| 6,908,149 | B1 | 6/2005 | Yamaguchi et al. |
| 7,866,696 | B2 | 1/2011 | Wang et al. |
| 8,297,697 | B2 | 10/2012 | Gross et al. |
| 8,998,320 | B2 * | 4/2015 | Mankame .............. B60N 2/919 297/284.11 |
| 9,403,452 | B2 | 8/2016 | Subramanian et al. |
| 10,232,740 | B1 * | 3/2019 | Jaradi ..................... B60N 2/20 |
| 2006/0167604 | A1 * | 7/2006 | Hibner ................. G01G 23/163 701/45 |
| 2006/0273644 | A1 | 12/2006 | Sturt et al. |
| 2019/0232822 | A1 | 8/2019 | Hintermaier |

* cited by examiner

VEHICLE SEAT FOR A MOTOR VEHICLE AND METHOD OF POSITIONING THE SAME

INTRODUCTION

The present disclosure relates to vehicle seats for motor vehicles, and more particularly to a seat positioning system that improves the ride quality of motor vehicles and increases support for passengers under certain threshold conditions in order to maintain an effective lap belt engagement with the occupant pelvis.

Automotive manufacturers are continuously investigating improvements in ride quality for increasing the comfort of vehicle occupants. For instance, vehicle seats for one or more front-row passengers or rear-row passengers may be configured to recline. These vehicle seats can include 3-point seat belts with a lap belt portion and a shoulder belt portion, and these vehicle seats can further include additional structure in the seat cushion for engaging the pelvis during forward translation and limiting forward movement of the occupant during a front impact collision. This additional structure in the seat cushion may decrease occupant comfort when seated in an upright position. In one example, an airbag system may be integrated in the seat cushion and configured to rapidly deploy one or more air cells that move the pelvis to a position such that the pelvis is directly engaged by the lap belt. The airbag system can increase the complexity of the vehicle seat, and the airbag system must be integrated with the vehicle crash sensing system. These structural or airbag countermeasures in the seat cushion can also increase the cost of vehicle seats and increase the weight of the vehicle. Furthermore, because the airbag system and surrounding seat structure is rapidly displaced during a collision, inflation devices may be activated with certain speed and force proximal to the vehicle occupant.

Thus, while some existing vehicle seats may include features intended to enhance engagement between the lap belt and the pelvis when in a reclined state, the effectiveness and/or comfort may be limited. Therefore, a need exists for a new and improved vehicle seat that addresses these issues.

SUMMARY

According to several aspects of the present disclosure, a vehicle seat for a motor vehicle is provided. The vehicle seat includes a seat bottom and a seatback, with the seatback and the seat bottom being displaceable relative to one another along at least one of an angular direction and a linear direction. The vehicle seat further includes a seat positioning system having an actuator for displacing one of the seat bottom and the seatback toward the other of the seat bottom and the seatback. The seat positioning system further includes a position sensor for generating a seat position signal indicative of a position of one of the seat bottom and the seatback relative to the other of the seat bottom and the seatback. The seat positioning system further includes a controller electrically coupled to position sensor and the actuator. The controller is configured to compare the position to a position threshold in response to the controller receiving the seat position signal from the position sensor. The controller is further configured to generate an activation signal in response to the controller determining that the position is above the position threshold. The actuator displaces one of the seat bottom and the seatback toward the other of the seat bottom and the seatback in response to the actuator receiving the activation signal from the controller.

In one aspect, the vehicle seat further includes a seat belt having a webbing, a tongue carried by the webbing, and a buckle releasably fastened to the tongue. The seat positioning system further includes a seat belt sensor for generating a fastened signal in response to the seat belt sensor detecting that the buckle and tongue are engaged to one another. The controller is electrically coupled to the seat belt sensor, and the controller is configured to generate the activation signal in further response to the controller receiving the fastened signal from the seat belt sensor.

In another aspect, the seat belt sensor is configured to generate an unfastened signal in response to the seat belt sensor detecting that the buckle and the tongue are disengaged from one another. The controller is configured to not generate the activation signal in response to the controller receiving the unfastened signal from the seat belt sensor.

In another aspect, the seat positioning system further includes a weight sensor coupled to one of the seat bottom and the seatback, with the weight sensor generating a load signal indicative of a load on the vehicle seat. The controller is electrically coupled to the weight sensor. The controller is configured to compare the load to a load threshold in response to the controller receiving the load signal from the weight sensor, and the controller is configured to generate the activation signal in further response to the controller determining that the load is above the load threshold.

In another aspect, the controller is configured to not generate the activation signal in response to the controller determining that the load is below the load threshold.

In another aspect, the seat positioning system further includes a door condition sensor for generating a door closed signal in response to an associated vehicle door being disposed in a closed position. The controller is electrically coupled to the door condition sensor, and the controller is configured to generate the activation signal in further response to the controller receiving the door closed signal from the door condition sensor.

In another aspect, the door condition sensor is configured to generate a door ajar signal in response to the associated vehicle door being disposed in an opened position. The controller is configured to not generate the activation signal in response to the controller receiving the door ajar signal from the door condition sensor.

In another aspect, the seat bottom has front and rear ends with the rear end positioned adjacent to the seatback. The seat bottom is angularly displaceable about the rear end, and the actuator angularly displaces the front end of the seat bottom toward the seatback in response to the actuator receiving the activation signal from the controller.

In another aspect, the seat bottom is angularly spaced relative to a horizontal plane in response to the actuator angularly displacing the front end of the seat bottom toward the seatback.

In another aspect, the vehicle seat further includes a thigh support member having forward and aft ends with the aft end connected to the front end of the seat bottom, such that the thigh support member is angularly displaceable about the aft end. The seat positioning system further includes a motor for angularly displacing the forward end of the thigh support member toward the seat bottom in response to the motor receiving the activation signal from the controller.

In another aspect, the thigh support member is angularly spaced relative to a horizontal plane in response to the motor angularly displacing the forward end of the thigh support member toward the seat bottom.

In another aspect, the actuator linearly displaces the seat bottom toward the seatback in response to the actuator receiving the activation signal from the controller.

According to several aspects of the present disclosure, a motor vehicle includes a propulsion system disposable in an active state for propelling the motor vehicle and generating a running signal in response to the motor vehicle being disposed in the active state. The motor vehicle further includes a vehicle seat having a seat bottom and a seatback, with the seatback and the seat bottom being displaceable relative to one another along at least one of an angular direction and a linear direction. The vehicle seat further includes a seat positioning system having an actuator for displacing one of the seat bottom and the seatback toward the other of the seat bottom and the seatback. The seat positioning system further includes a position sensor for generating a seat position signal indicative of a position of one of the seat bottom and the seatback relative to the other of the seat bottom and the seatback. The seat positioning system further includes a controller electrically coupled to the position sensor and the actuator. The controller is configured to compare the position to a position threshold in response to the controller receiving the seat position signal from the sensor. The controller is further configured to generate an activation signal in response to the controller determining that the position is above the position threshold and in further response to the controller receiving the running signal from the propulsion system. The actuator displaces one of the seat bottom and the seatback toward the other of the seat bottom and the seatback, in response to the actuator receiving the activation signal from the controller.

In one aspect, the vehicle seat further includes a seat belt having a webbing, a tongue carried by the webbing, and a buckle releasably fastened to the tongue. The seat positioning system further includes a seat belt sensor for generating a fastened signal in response to the seat belt sensor detecting that the buckle and tongue are engaged to one another. The controller is electrically coupled to the seat belt sensor, and the controller is configured to generate the activation signal in further response to the controller receiving the fastened signal from the seat belt sensor.

In another aspect, the propulsion system is configured to generate an inactive signal indicative of the motor vehicle being at least one of parked and turned off, and the controller is configured to not generate the activation signal in response to the controller receiving the inactive signal from the propulsion system.

According to several aspects of the present disclosure, a method for operating a vehicle seat for a motor vehicle is provided. The vehicle seat includes a seatback and a seat bottom displaceable relative to one another, and the vehicle seat further includes an actuator, a sensor, and a controller electrically coupled to the actuator and the sensor. The method includes displacing at least one of the seat bottom and the seatback. The position sensor generates a seat position signal indicative of a position of one of the seat bottom and the seatback relative to the other of the seat bottom and the seatback. The controller compares the position to a position threshold in response to the controller receiving the seat position signal from the position sensor. The controller generates an activation signal in response to determining that the position is above the position threshold. The actuator displaces one of the seat bottom and the seatback toward the other of the seat bottom and the seatback, in response to the actuator receiving the activation signal from the controller.

In one aspect, a seat belt sensor generates a fastened signal in response to the seat belt sensor detecting that a buckle and a tongue for the vehicle seat are engaged to one another. The controller generates the activation signal in further response to the controller receiving the fastened signal from the seat belt sensor.

In another aspect, a weight sensor generates a load signal indicative of a load on the vehicle seat. The controller compares the load to a load threshold in response to the controller receiving the load signal from the weight sensor. The controller generates the activation signal in further response to the controller determining that the load is above the load threshold.

In another aspect, a door condition sensor generates a door closed signal in response to an associated vehicle door being disposed in a closed position. The controller generates the activation signal in response to the controller receiving the door closed signal from the door condition sensor.

In another aspect, the seat belt sensor generates an unfastened signal in response to the seat belt sensor detecting that a buckle and a tongue are disengaged from one another. The controller determines that the load is below the load threshold, and the door condition sensor generates a door ajar signal in response to the associated vehicle door being disposed in an opened position. The controller does not generate the activation signal in response to at least one of: the controller receiving the unfastened signal from the seat belt sensor; the controller determining that the load is below the load threshold; the controller receiving the door ajar signal from the door condition sensor; and the controller receiving the inactive signal from the propulsion system.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

An exemplary seat positioning system to be used for securing a vehicle occupant against forward motion and preventing the pelvis from moving underneath a lap belt under certain threshold conditions is described. The threshold process conditions can be customized or empirically determined based on the desired level of restraint using a multi-dimensional look-up table, a suitable algorithm, a computer simulation, machine learning methods, regression or response surface methods, parametric equation, artificial intelligence methods, or any combination of these methods. The term "restraint" refers to securing a vehicle occupant against any movement that may result during a collision. As but one example, restraint can be achieved by angularly raising a front end of a seat bottom by a specific angle toward the seatback and/or relative to a horizontal plane, with the angle being empirically-determined as an acceptable level of supporting the occupant against forward motion. Examples of the acceptable restraint conditions can include angularly and/or linearly moving of one of the seatback and the seat bottom relative to the other of the seatback and the seat bottom as a function of various parameters detected by associated sensors. Examples of these parameters can include: (1) an angle at which the seatback is reclined; (2) a status of a corresponding seat belt; (3) the weight of the vehicle occupant; (4) a status of a vehicle door; (5) a status of a propulsion system for the vehicle; (6) the presence and/or classification of the vehicle occupant as detected by RADAR, LIDAR, cameras or other sensors; (7) the geo-location of the vehicle; (8) an emergency state of the vehicle; and/or (9) an operation mode of the vehicle. However, the desired level of restraint can be determined as a function of other parameters for particular applications. Thus, while the disclosure is directed to various devices, systems, and methods for restraining a forward-facing occupant against forward motion in a vehicle seat, it is contemplated that any number of these devices, systems, methods, or combinations thereof can be used in various other suitable applications where restraint is required.

Figure 1:
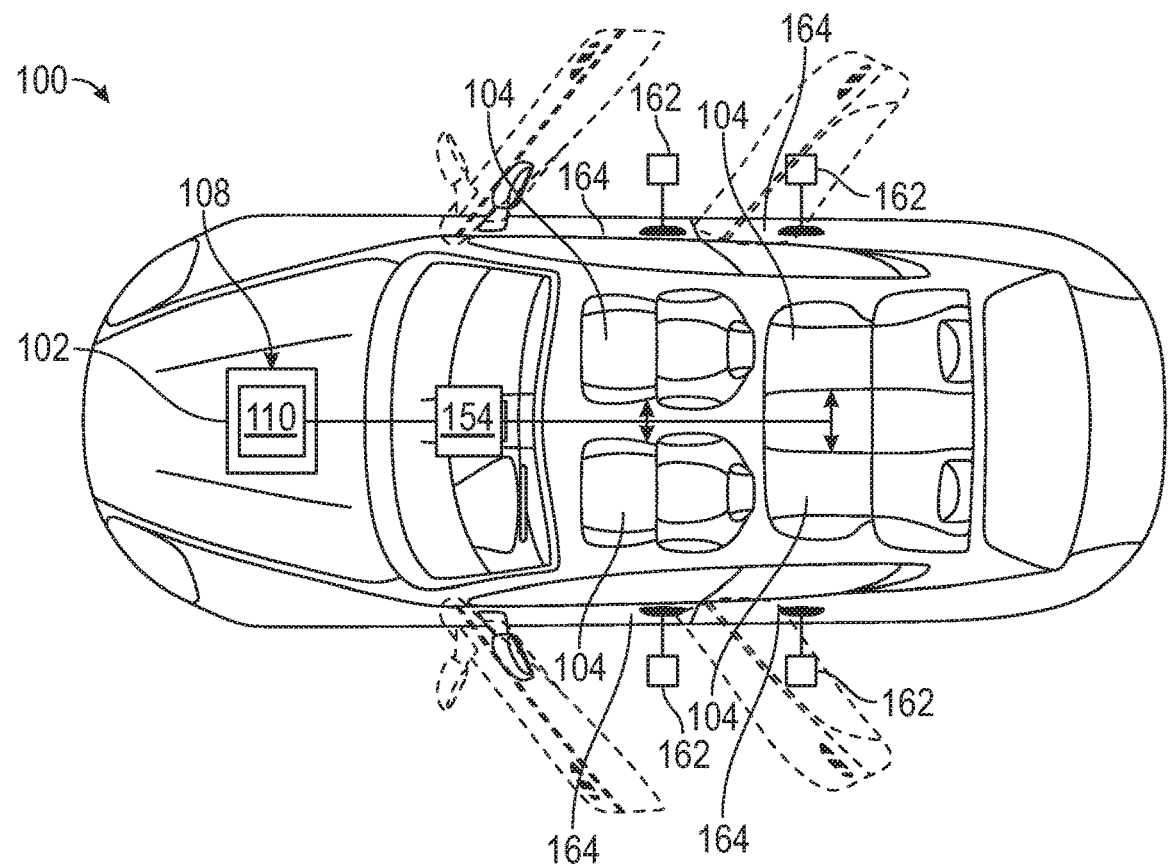
FIG. 1 is a schematic diagram of a motor vehicle having a plurality of vehicle seats and a seat positioning system having actuators for positioning the vehicle seats under certain threshold conditions.
Figure 2:
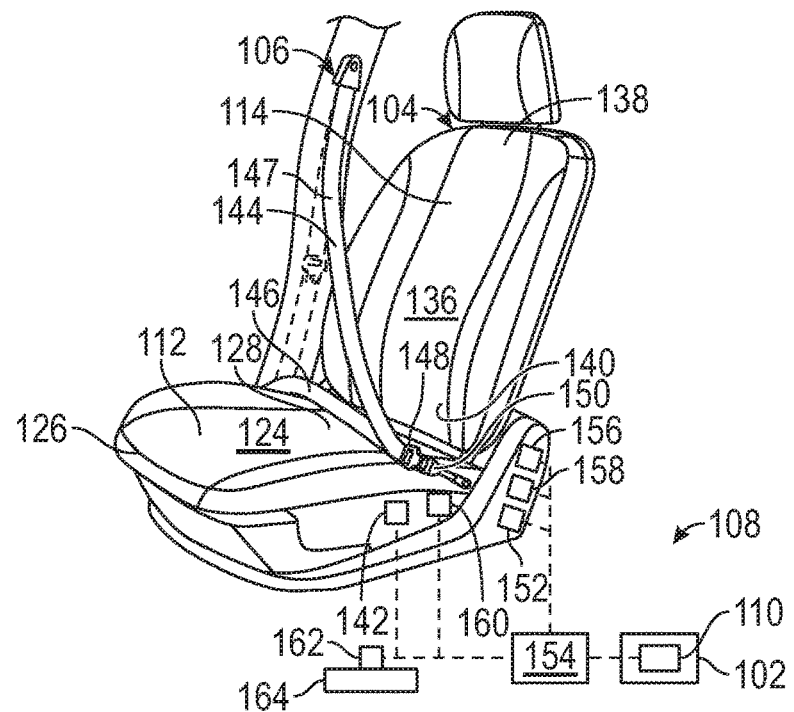
FIG. 2 is a perspective view of one of the vehicle seats of FIG. 1.

Referring to FIGS. 1 and 2, a motor vehicle 100 includes a propulsion system 102 and a plurality of vehicle seats 104, with each vehicle seat 104 having a seat belt 106 and a seat positioning system 108 that positions an occupant for transmitting a load from the seat belt 106 to the pelvis of the occupant. One example of the motor vehicle 100 can include an SAE Level 5 fully autonomous vehicle with sustained and unconditional performance of Dynamic Driving Tasks (DDT) by an Automated Driving System (ADS) without expectation that a passenger will respond to a request to intervene. Because the passenger is not expected to intervene, the passenger can remain on the vehicle seat with the seatback in a fully reclined position during the entire trip. In other examples, it is contemplated that the motor vehicle can be: (1) an SAE Level 0 vehicle with no driving automation; (2) an SAE Level 1 vehicle with driver assistance; (3) an SAE Level 2 vehicle with partial driving automation; (4) an SAE Level 3 vehicle with conditional driving automation; or (4) an SAE Level 4 vehicle with high driving automation.

The propulsion system 102 is disposable in an active state where the vehicle is turned on and the propulsion system 102 is capable of propelling the motor vehicle 100. The propulsion system 102 is configured to generate a running signal in response to the motor vehicle 100 being disposed in the active state. The propulsion system 102 is further disposable in an inactive state where the vehicle is at least one of parked and turned off, and the propulsion system 102 is configured to generate an inactive signal indicative of the motor vehicle being in the inactive state. More specifically, continuing with the previous example, the propulsion system 102 can have an electric-drive powertrain control unit 110 disposable in the active state for propelling the fully autonomous vehicle. The electric-drive powertrain control unit 110 may be configured to generate the running signal in response to the motor vehicle 100 being disposed in the active state. The electric-drive powertrain control unit 110 is further disposable in an inactive state where the vehicle is parked or turned off. The electric-drive powertrain control unit 110 may be configured to not generate the running signal in response to the motor vehicle 100 being disposed in the inactive state.

While the propulsion system for the fully autonomous vehicle of FIG. 1 includes the electric-drive powertrain control unit, It is contemplated that other examples of the propulsion system can instead include an engine electronic control unit for gasoline or diesel IC engines, a dosing control unit, a transmission control unit (TCU), a shift-by-wire control unit (SBW), an electric-variable cam timing driver unit (e-VCT), or a fuel pump controller (FPC). Each of these control units can be disposable in an active state to facilitate propulsion of the vehicle and configured to generate a running signal in response to the motor vehicle being disposed in the active state. Each of these control units can be further disposable in an inactive state where the vehicle is parked or turned off, and these control units can be configured to not generate a running signal in response to the motor vehicle being disposed in the inactive state.

Figure 3:
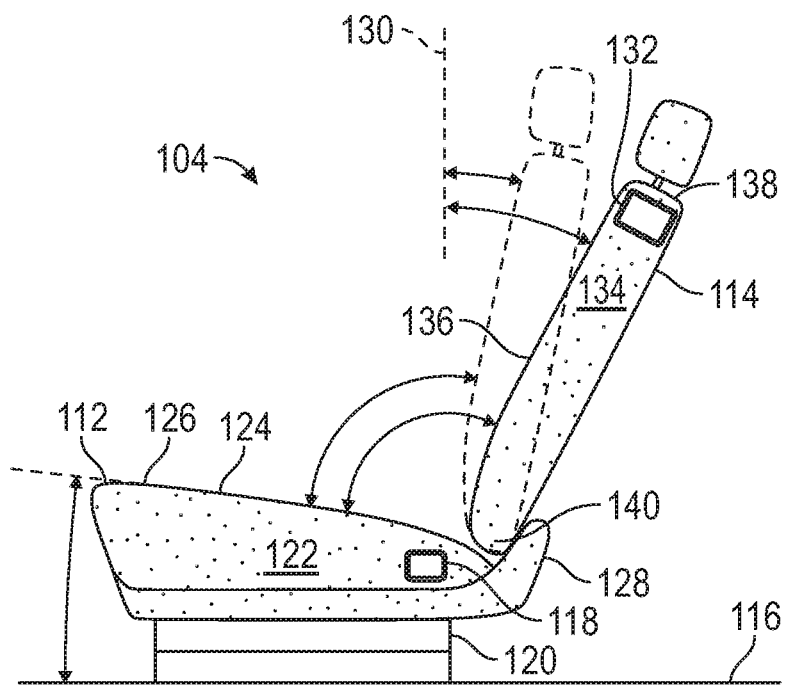
FIG. 3 is a schematic side view of the vehicle seat of FIG. 2, illustrating the vehicle seat having a seatback angularly disposed a first angle relative to the seat bottom, with the first angle being below an angular threshold.
Figure 4:
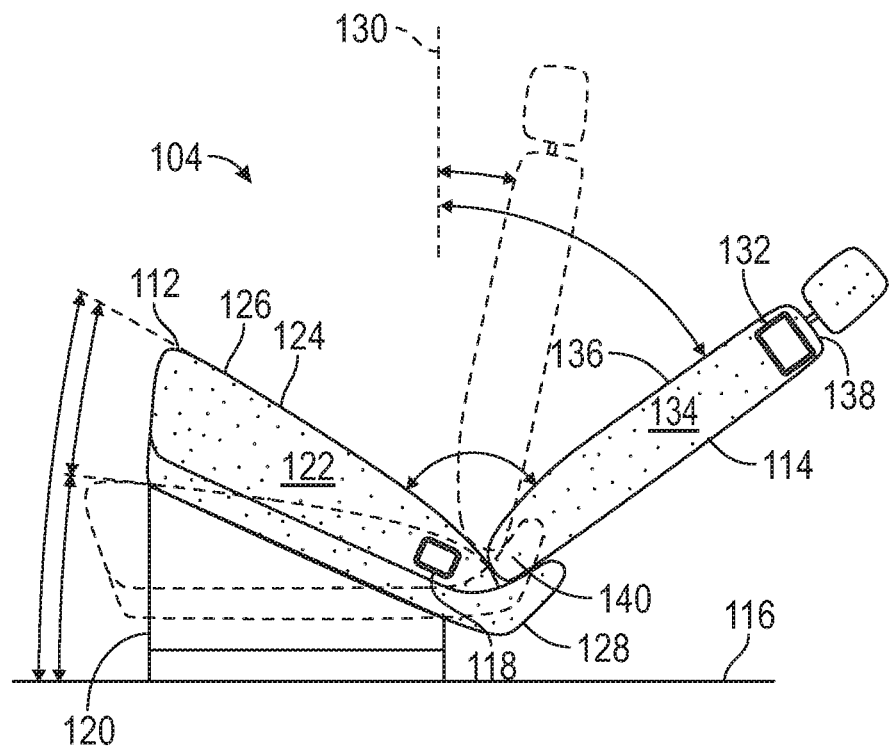
FIG. 4 is a schematic side view of the vehicle seat of FIG. 3, illustrating the seatback angularly displaced to a second angle relative to the seat bottom, with the seat positioning system angularly displacing the seat bottom toward the seatback in response to the second angle being above the angular threshold.

Referring to FIGS. 2-4, each vehicle seat 104 includes a seat bottom 112 and a seatback 114 displaceable relative to one another along at least one of an angular direction and a linear direction. More specifically, as best shown in FIG. 4, the seat bottom 112 is angularly displaceable relative to a horizontal plane, such as a floor pan 116 of the vehicle 100. In this example, the seat bottom 112 includes a conventional bottom frame section 118 with a pair of side rails and a plurality of cross members extending between the side rails. The bottom frame section may be coupled to a four-bar linkage assembly 120 that is in turn coupled to the floor pan 116. However, it is contemplated that the conventional seat bottom can be mounted to the floor pan and be angularly displaceable relative to the same by other suitable support mechanisms. Furthermore, in this example, the seat bottom is linearly displaceable relative to the horizontal plane, such as the floor pan 116. It is contemplated that the vehicle seat 104 can further include the seatback 114 carried linearly on the floor pan 116 by the seat bottom 112. However, in still other examples, it is contemplated that the seatback can be linearly displaceable relative to the horizontal plane, e.g. floor pan, independently from the seat bottom.

The seat bottom 112 further includes a bottom cushion 122, which is a foam padding coupled to the bottom frame section 118. However, the bottom cushion can be comprised of any suitable material. The seat bottom 112 further includes a seat cover 124 or Class A surface, which is made of a layer that surrounds the bottom cushion 122. Furthermore, the seat bottom 112 includes front and rear ends 126, 128, with the rear end 128 positioned adjacent to the seatback 114 and the seat bottom 112 being angularly displaceable about the rear end 128. The seat bottom 112 is angularly displaceable about the rear end 128 such that the seat cover 124 is disposed at an angle relative to the horizontal plane and the bottom frame section 118 is disposed at an angle relative to the horizontal plane. Continuing with the previous example, the rear end 128 of the seat bottom 112 can be coupled to a rear joint of the four-bar linkage assembly 120 and the front end 126 can be coupled to a front joint of the four-bar linkage assembly 120.

The seatback 114 is angularly displaceable relative to a vertical plane 130 independent of the seat bottom 112. In this example, the seatback 114 includes a conventional back frame section 132 with a pair of side rails pivotally attached to the rear end 128 of the bottom frame section 118 for the seat bottom 112. Other examples of the back frame section can be pivotally attached to other suitable support mechanisms, such as a bracket that is separate from the seat bottom and mounted directly to the floor pan. The back frame section 132 further includes a plurality of cross members extending between the side rails.

The seatback 114 further includes a back cushion 134, which is a foam padding coupled to the back frame section 132. However, the back cushion can be comprised of any suitable material. The seatback 114 further includes a seat cover 136 or Class A surface, which is made of a layer that surrounds the back cushion 134. The seatback 114 includes upper and lower ends 138, 140, with the lower end 140 positioned adjacent to the seat bottom 112. The seatback 114 is angularly displaceable about the lower end 140 such that the seat cover 136 is disposed up to a first maximum angle relative to the vertical plane and a second maximum angle relative to the seat bottom 112. As one example, the seatback 114 can be angularly displaced about the lower end 140 such that the seat cover 136 is positioned up to ninety degrees from the vertical plane and/or one hundred eighty (180) degrees from the seat cover 124 of the seat bottom 112. Put another way, the vehicle seat may be fully reclined with the seatback and the seat bottom collectively providing a flat horizontal support surface for the vehicle occupant when, for example, the motor vehicle is in an inactive state.

The vehicle seat 104 can further include a conventional locking mechanism disposable in a locked state for holding the seatback 114 in a fixed angular position relative to the vertical plane and an unlocked state where the seatback 114 is movable relative to the vertical plane 130 and the seat bottom 112. The locking mechanism can include a biasing member for moving the locking mechanism to the locked state. The locking mechanism 142 can further include a lever, which may be operated by the vehicle occupant for moving the locking mechanism to the unlocked state, where the user can angularly displace the seatback rearward from seat bottom 112 and the vertical plane 130. The vehicle seat 104 can further include a conventional spring coupled to the seatback 114 for angularly returning the seatback 114 toward an upright position. The spring may be a torsional spring having one end attached to the seatback and an opposite end attached to the seat bottom 112 or a support structure mounted to the floor pan 116.

Referring back to FIG. 2, the seat belt 106 is a three-point seat belt with webbing 144 that provides a lap belt 146 and a shoulder belt 147. The seat belt 106 further includes a tongue 148 carried by the webbing 144 and a stationary buckle 150, which is mounted to the vehicle or the vehicle seat. The buckle 150 and the tongue 148 are releasably fastened to one another for securing the vehicle occupant on the vehicle seat. It is contemplated that the vehicle seat can include other suitable seat belts.

The motor vehicle 100 further includes a seat positioning system 108 having an actuator 152, which is coupled to one of the seat bottom 112 and the seatback 114 for angularly displacing toward the other of the seat bottom 112 and the seatback 114 under certain threshold conditions. In this example, the actuator 152 is a servomotor coupled to the seat bottom 112 and configured to angularly displace the front end 126 of the seat bottom 112 upward relative to the floor pan 116 and toward the seatback 114. In other examples, the actuator 152 may be a solenoid or other suitable actuators and/or coupled to the seat bottom 112 and/or the seatback 114 for angularly displacing the seat bottom 112 and the seatback toward one another. Non-limiting examples of threshold conditions that are detected by sensors and/or determine by a controller 154 for activating the actuator 152 can include: (1) an angle at which the seatback is reclined; (2) a status of a corresponding seat belt; (3) the weight of the vehicle occupant; (4) a status of a vehicle door; and/or (5) a status of a propulsion system for the vehicle. However, the threshold conditions can be directed to other parameters for particular applications.

The seat positioning system 108 includes one or more position sensors for detecting the threshold conditions. Continuing with the previous example, these sensors include an angle sensor 156 for measuring an angle A1 between the seat bottom 112 and the seatback 114, and the angle sensor 156 generates a seat position signal indicative of the same. In other examples, the angle sensor can be configured to measure an angle between the seatback 114 and a vertical plane or other reference point, with the seat position signal indicating the same.

The sensors further include a seat belt sensor 158 for detecting whether the buckle 150 and the tongue 148 are engaged to one another, and the seat belt sensor 158 is configured to generate a fastened signal in response to the seat belt sensor 158 detecting the same. The seat belt sensor 158 is further configured to generate an unfastened signal in response to the seat belt sensor 158 detecting that the buckle 150 and the tongue are disengaged from one another.

The seat positioning system 108 further includes a weight sensor 160 coupled to one of the seat bottom 112 and the seatback 114, with the weight sensor 160 being configured to generate a load signal indicative of a load on the vehicle seat 104.

The seat positioning system 108 further includes a door condition sensor 162 configured to generate a door closed signal in response to an associated vehicle door 164 being disposed in a closed position. The door condition sensor 162 is configured to generate a door ajar signal in response to the associated vehicle door 164 being disposed in an opened position.

The seat positioning system 108 further includes a controller 154 electrically coupled to the angle sensor 156. The controller 154 is configured to compare the angle A1 to an angular threshold in response to the controller 154 receiving the seat position signal from the angle sensor 156. In this example, the angular threshold is 120 degrees. It may be empirically determined that a vehicle seat, which is positioned such that the seat covers 124, 136 of the associated seat bottom 112 and seatback 114 are angularly spaced more than one-hundred twenty (120) degrees from one another, may increase the risk of the lap belt 146 not fully engaging the pelvis during a collision. However, it is contemplated that the angular threshold can be above or below 120 degrees.

In this example, the controller 154 is further electrically coupled to the seat belt sensor 158. The controller 154 is configured to determine that the tongue 148 is engaged to the buckle 150 in response to the controller 154 receiving the fastened signal from the seat belt sensor. In addition, the controller 154 is also electrically coupled to the weight sensor 160. The controller 154 is configured to compare the load to a load threshold in response to the controller 154 receiving the load signal from the weight sensor 160. In one example, the load threshold may correspond with a fifth percentile female. It is contemplated that the load may correspond with any suitable value corresponding with a vehicle occupant being seated on the vehicle seat. Furthermore, the controller 154 is electrically coupled to the door condition sensor 162 and configured to determine that the vehicle door 164 is disposed in a closed position in response to the controller 154 receiving the door closed signal from the door condition sensor 162. The controller 154 is configured to generate an activation signal in response to: (1) the controller 154 determining that the seatback 114 is angularly displaced relative to the seat bottom 112 by an angle that is larger than the angular threshold; (2) the controller 154 receiving the fastened signal from the seat belt sensor 158; (3) the controller 154 determining that the load on the vehicle seat 104 is above the load threshold; (4) the controller 154 receiving the door closed signal from the door condition sensor 162; and (5) the controller 154 receiving the running signal from the propulsion system 102. It is contemplated that the controller can generate the activation signal in response to other threshold conditions detected by any suitable sensor or determined by the controller.

The actuator 152 angularly displaces one of the seat bottom and the seatback toward the other of the seat bottom and the seatback in response to the actuator receiving the activation signal from the controller. In this example, the actuator is configured to angularly displace the front end 126 of the seat bottom 112 upward and toward the seatback 114 in response to the actuator 152 receiving the activation signal from the controller 154. More specifically, the actuator 152 may angularly displace the front end 126 of the seat bottom 112 toward the seatback 114 to a position at least twenty (20) degrees from a horizontal plane, in response to any one or more threshold conditions. In another example, the controller 154 can include a lookup table with a plurality of angle displacements for corresponding threshold conditions, and the actuator 152 can angularly displace the front end 126 of the seat bottom 112 by the angle corresponding with the detected threshold conditions and the lookup table. In yet another example, the controller can execute an algorithm to calculate the angle as a function of any one or more threshold conditions. In still another example, where the angular threshold is one-hundred twenty (120) degrees and the seatback 114 is fully reclined to a horizontal position angularly spaced from the seat bottom 112 by an angle above the angular threshold, the actuator 152 may angularly raise the seat bottom 112 to a position thirty (30) degrees from the horizontal plane and the actuator may raise the seatback 114 to a position thirty (30) degrees from the horizontal plane such that the seat bottom 112 and the seatback 114 are angularly spaced one-hundred twenty (120) degrees from one another in a V-shaped profile.

The controller 154 can be further configured to avoid generating the activation angle in response to any one or more of the following threshold conditions: (1) the controller 154 determining that the seatback 114 is angularly displaced relative to the seat bottom 112 by an angle that is below the angular threshold; (2) the controller 154 receiving the unfastened signal from the seat belt sensor 158; (3) the controller 154 determining that the load on the vehicle seat 104 is below the load threshold; (4) the controller 154 receiving the door ajar signal from the door condition sensor 162; and (5) the controller 154 receiving the inactive signal from the propulsion system 102. It is contemplated that the controller can be configured to not generate the activation signal in response to one or more sensors detecting parameters that do not meet other threshold conditions.

Figure 5:
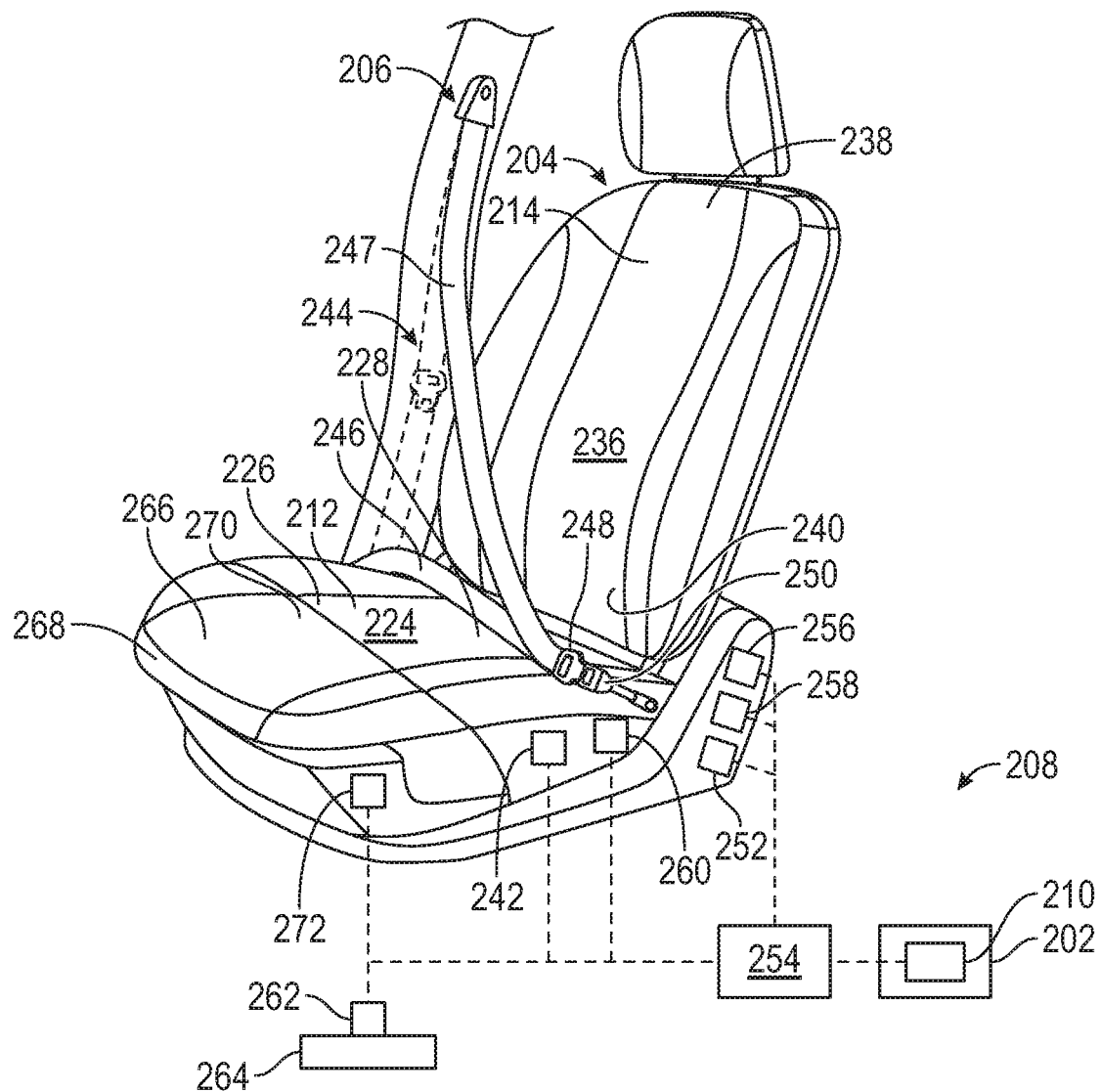
FIG. 5 is a perspective view of another example of a vehicle seat of FIG. 1, illustrating the vehicle seat having a seatback angularly disposed a first angle relative to the seat bottom and the vehicle seat further including a thigh support member that is angularly displaceable relative to the seat bottom.
Figure 6:
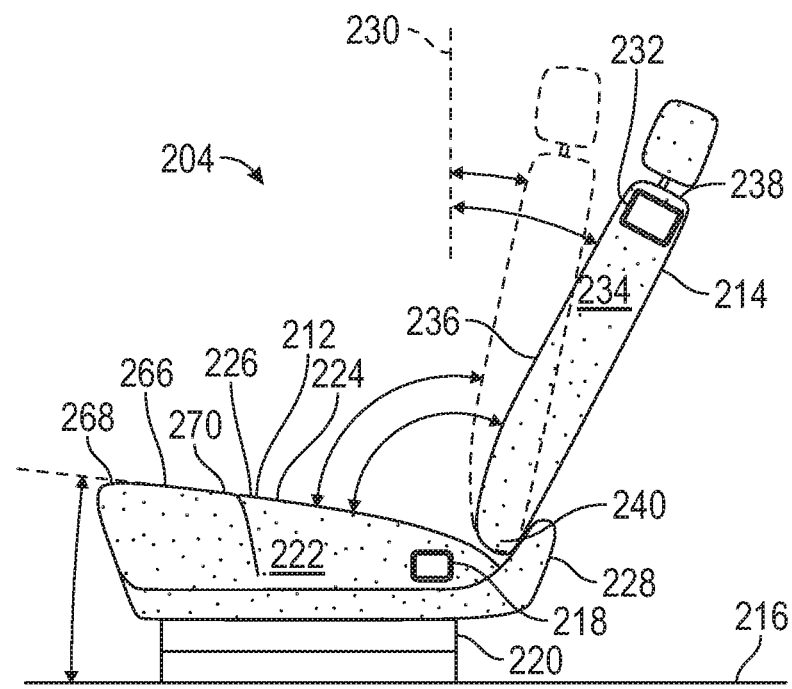
FIG. 6 is a schematic side view of the vehicle seat of FIG. 5, illustrating the vehicle seat having a seatback angularly disposed a first angle relative to the seat bottom, with the first angle being below an angular threshold.
Figure 7:
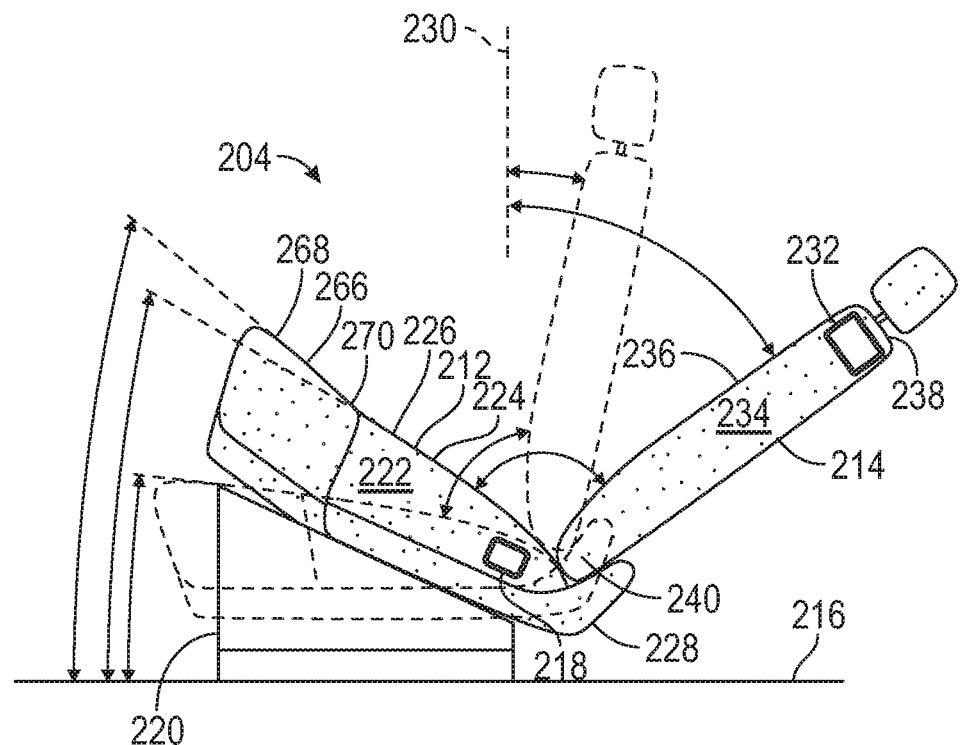
FIG. 7 is a schematic side view of the vehicle seat of FIG. 6, illustrating the seatback angularly displaced to a second angle relative to the seat bottom, with the seat positioning system angularly displacing the seat bottom toward the seatback and angularly displacing the thigh support member toward the seat bottom in response to the second angle being above the angular threshold.

Referring now to FIGS. 5-7, a seat positioning system 208 is similar to the seat positioning system 108 of FIGS. 4-6 and has the same components identified by the same reference numbers increased by 100. However, the vehicle seat 204 of FIGS. 5-7 further includes a thigh support member 266, such as a ramp having forward and aft ends 268, 270 with the aft end 270 connected to the front end 226 of the seat bottom 212, and the thigh support member 266 being angularly displaceable about the aft end 270. Furthermore, the seat positioning system 208 also includes a motor 272 for angularly displacing the forward end 268 of the thigh support member 266 toward the seat bottom 212 in response to the motor 272 receiving the activation signal from the controller 254. The motor angularly displaces the thigh support member 266 More specifically, the motor 272 may angularly displace the forward end 268 of the thigh support member 266 toward the seat bottom 212 to a position at least ten (10) degrees from the seat bottom 212 or at least thirty (30) degrees from the horizontal plane, in response to any one or more threshold conditions. In another example, the controller 254 can include a lookup table with a plurality of angle displacements for corresponding threshold conditions, and the motor 166 can angularly displace the forward end 268 of the thigh support member 266 by the angle corresponding with the detected threshold conditions and the lookup table. In yet another example, the controller 254 can execute an algorithm to calculate the angle as a function of any one or more threshold conditions.

Figure 8:
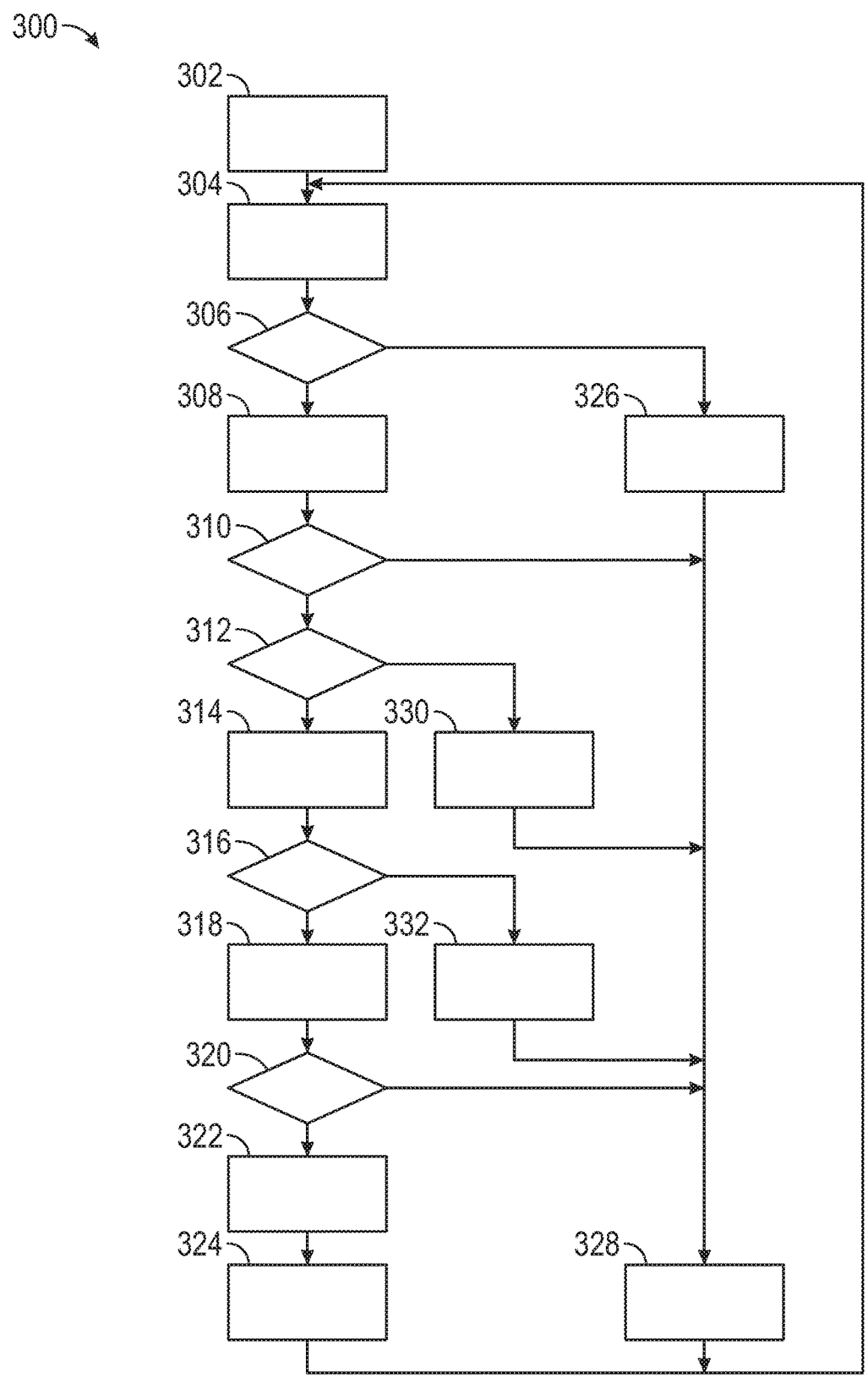
FIG. 8 a flow chart for an example of a method for operating the vehicle seat of FIG. 1.

Referring now to FIG. 8, one example of a method 300 for operating the vehicle seat of FIG. 1 is shown. The controller 154 receives input signals from multiple sensors and executes one or more functions based on one or more input data signals and associated thresholds, such that the controller can determine whether to leave the seat in its current position or generate an activation signal for moving the vehicle seat to a selected position. In one example, the controller receives input data from the sensors every time that a sensor reading changes. In another example, the controller receives the input data once every predetermined time interval. It is contemplated that the controller can receive the input data at any suitable frequency and/or during various vehicle events. The function and associated threshold values can be pre-determined through testing, computer simulation, empirical data analysis, machine learning tools, or any combination of the same. Furthermore, the function and threshold values can be represented in the controller by one or more lookup tables, regression or response surface methods, parametric equations, algorithms, artificial intelligence methods, or combinations of the same. While the following non-limiting example is directed to a method including the controller executing multiple independent functions of associated input data and thresholds, another non-limiting example of the method can include the controller executing a single function of all of the input data and a single threshold.

The method commences at block 302 with at least one of the seat bottom 112 and the seatback 114 being angularly displaced relative to the other. This step can be accomplished by the vehicle occupant operating the locking mechanism 142 and manually applying a load to the seatback to angularly displace the seatback 114 to a reclined position relative to the seat bottom 112 that exceeds the angular threshold. Continuing with the previous example, the vehicle occupant may operate the locking mechanism 142 to tilt the seatback one hundred twenty (120) or more degrees from the seat bottom 112 and thirty (30) or more degrees from the vertical plane. In other examples, the vehicle seat may be powered seats with motors such that the vehicle occupant may operate a control mechanism for actuating a motor (not shown) to one of the seat bottom and the seatback relative to the other of the seat bottom and the seatback.

At block 304, the angle sensor 156 generates a seat position signal indicative of the angle between the seat bottom 112 and the seatback 114.

At block 306, the seat belt sensor 158 determines whether the seat belt 106 for the vehicle seat 104 has been fastened. If the seat belt sensor 158 determines that the tongue 148 and the buckle 150 are engaged to one another, the method proceeds to block 308. If the seat belt sensor 158 determines that the tongue 148 and the buckle 150 are disengaged from one another, the method proceeds to block 326.

At block 308, the seat belt sensor 158 generates a fastened signal.

At block 310, the weight sensor 160 generates a load signal indicative of a load on the vehicle seat, and the controller 154 determines whether the load is above a load threshold in response to the controller 154 receiving the load signal from the weight sensor. If the controller 154 determines that the load is above the load threshold, the method proceeds to block 312. If the controller 154 determines that the load is below the load threshold, the method proceeds to block 328.

At block 312, the door condition sensor 162 determines whether the associated vehicle door for the vehicle seat is disposed in a closed position or an opened position. If the door condition sensor 162 determines that the vehicle door 164 is disposed in the closed position, the method proceeds to block 314. If the door condition sensor 162 determines that the vehicle door 164 is opened, the method proceeds to block 330.

At block 314, the door condition sensor 162 generates a door closed signal.

At block 316, the control unit 110 of the propulsion system 102 determines whether the propulsion system 102 is in the active state where the propulsion signal is capable of propelling the vehicle or the inactive state where the motor vehicle 100 is parked or turned off. If the control unit 110 determines that the propulsion system 102 is disposed in the active state, the method proceeds to block 318. If the control unit 110 determines that the propulsion system is disposed in the inactive state, the method proceeds to block 332.

At block 318, the control unit 110 generates the running signal in response to the control unit 110 determining that the propulsion system is in the active state.

At block 320, the controller 154 compares the angle between the seatback 114 and the seat bottom 112 to an angular threshold in response to the controller 154 receiving the seat position signal from the angle sensor 156. If the angle is above the angular threshold, the method proceeds to block 318.

At block 322, the controller 154 generates the activation signal. This step may be accomplished by the controller 154 retrieving from memory a single fixed predetermined angular displacement value, accessing a lookup table of a plurality of angular displacement values for corresponding threshold conditions, and/or executing an algorithm based on the threshold conditions measured by the sensors.

At block 324, the actuator 152 angularly displaces one of the seat bottom 112 and the seatback 114 toward the other of the seat bottom 112 and the seatback 114. Continuing with the previous example, the actuator 152 angularly displaces the front end 126 of the seat bottom 112 upward and toward the seatback 114 by a predetermined angle, such as twenty (20) degrees. Other examples of the actuator can angularly displace the front end 126 of the seat bottom 112 upward and toward the seatback 114 by a predetermined angle above or below twenty (20) degrees. In another example, the actuator can angularly displace one of the seat bottom and the seatback toward the other of the seat bottom and the seatback by one of a plurality of angles corresponding with detected threshold conditions stored within a lookup table. In still another example, the actuator can angularly displace one of the seat bottom and the seatback toward the other of the seat bottom and the seatback by an angle determined by the controller using an algorithm that is a function of the detected threshold conditions. The method then returns to block 304.

In this example, if any of the threshold conditions in any one or more of blocks 306, 310, 312, 316, and 320 are not satisfied, it is empirically determined that the seat bottom 112 and the seatback 114 do not need to be displaced relative to one another. For instance, if at block 306, the seat belt sensor 158 determines that the tongue 148 and the buckle 150 are disengaged from one another, the method proceeds to block 326 where the seat belt sensor 158 generates the unfastened signal, and the method then proceeds to block 328. At block 328, the controller 154 does not generate the activation signal, and the method returns to block 304. If at block 310, the controller 154 determines that the load is below or equal to the load threshold, the method proceeds to block 328. Furthermore, if at block 312, the door condition sensor 162 determines that the door is disposed in the open position, the method proceeds to block 330, where the door condition sensor 162 generates a door ajar signal, and the method then proceeds to block 328. If at block 316, the control unit 110 of the propulsion system 102 determines that the propulsion system 102 is disposed in the inactive state, the method proceeds to block 332, where the control unit 110 generates the inactive signal, and the method then proceeds to block 328. In addition, if at block 320, the controller 154 determines that the angle is below or equal to the angular threshold, the method proceeds to block 328. It is contemplated that the method can avoid displacing the seat bottom toward the seatback under any one or more threshold conditions.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A vehicle seat for a motor vehicle, the vehicle seat comprising:
   a seat bottom having a front end and a rear end;
   a seatback, with the rear end of the seat bottom positioned adjacent to the seatback, and the seatback and the seat bottom being displaceable relative to one another along at least one of an angular direction and a linear direction; and
a seat positioning system comprising:
an actuator for displacing the seat bottom relative to the seatback;
a position sensor for generating a seat position signal indicative of a position of one of the seat bottom and the seatback relative to the other of the seat bottom and the seatback; and
a controller electrically coupled to the position sensor and the actuator, with the controller configured to:
compare the position to a position threshold in response to the controller receiving the seat position signal from the position sensor; and
generate an activation signal in response to the controller determining that the position is above the position threshold;
wherein the actuator angularly displaces the seat bottom in response to the actuator receiving the activation signal from the controller;
wherein the seat positioning system further includes a door condition sensor for generating a door closed signal in response to an associated vehicle door being disposed in a closed position;
wherein the controller is electrically coupled to the door condition sensor and configured to generate the activation signal in further response to the controller receiving the door closed signal from the door condition sensor; and
wherein the actuator angularly displaces the front end of the seat bottom upward from a floor pan and toward the seatback in response to the actuator receiving the activation signal.

2. The vehicle seat of claim 1 further comprising:
a seat belt associated with the vehicle seat, with the seat belt including a webbing, a tongue carried by the webbing, and a buckle releasably fastened to the tongue;
wherein the seat positioning system further includes a seat belt sensor for generating a fastened signal in response to the seat belt sensor detecting that the buckle and tongue are engaged to one another;
wherein the controller is electrically coupled to the seat belt sensor, and the controller is configured to generate the activation signal in further response to the controller receiving the fastened signal from the seat belt sensor, and the actuator angularly displaces the front end of the seat bottom upward from a floor pan and toward the seatback in response to the actuator receiving the activation signal.

3. The vehicle seat of claim 2 wherein the seat belt sensor is configured to generate an unfastened signal in response to the seat belt sensor detecting that the buckle and the tongue are disengaged from one another, wherein the controller is configured to not generate the activation signal in response to the controller receiving the unfastened signal from the seat belt sensor.

4. The vehicle seat of claim 2 wherein the seat positioning system further includes a weight sensor coupled to one of the seat bottom and the seatback, with the weight sensor generating a load signal indicative of a load on the vehicle seat;
wherein the controller is electrically coupled to the weight sensor and configured to:
compare the load to a load threshold in response to the controller receiving the load signal from the weight sensor; and
generate the activation signal in further response to the controller determining that the load is above the load threshold, wherein the actuator angularly displaces the front end of the seat bottom upward from the floor pan and toward the seatback in response to the actuator receiving the activation signal.

5. The vehicle seat of claim 4 wherein the controller is configured to not generate the activation signal in response to the controller determining that the load is below the load threshold.

6. The vehicle seat of claim 1 wherein the door condition sensor is configured to generate a door ajar signal in response to the associated vehicle door being disposed in an opened position;
wherein the controller is configured to not generate the activation signal in response to the controller receiving the door ajar signal from the door condition sensor.

7. The vehicle seat of claim 1 wherein the seat bottom has front and rear ends with the rear end positioned adjacent to the seatback, and the seat bottom being angularly displaceable about the rear end, wherein the actuator angularly displaces the front end of the seat bottom and toward the seatback in response to the actuator receiving the activation signal from the controller.

8. The vehicle seat of claim 1 further comprising a four-bar linkage assembly having front and rear joints, and the seat bottom has front and rear ends coupled to an associated one of the front and rear joints, wherein the seat bottom is angularly spaced relative to a horizontal plane in response to the actuator angularly displacing the front end of the seat bottom toward the seatback.

9. The vehicle seat of claim 8 further comprising:
a thigh support member having forward and aft ends with the aft end connected to the forward end of the seat bottom, with the thigh support member being angularly displaceable about the aft end; and
wherein the seat positioning system further includes a motor for angularly displacing the forward end of the thigh support member toward the seat bottom in response to the motor receiving the activation signal from the controller.

10. The vehicle seat of claim 9 wherein the thigh support member is angularly spaced relative to a horizontal plane in response to the motor angularly displacing the forward end of the thigh support member toward the seat bottom.

11. The vehicle seat of claim 1 wherein the actuator linearly displaces the seat bottom toward the seatback in response to the actuator receiving the activation signal from the controller.

12. A motor vehicle comprising:
a propulsion system disposable in an active state for propelling the motor vehicle and generating a running signal in response to the motor vehicle being disposed in the active state; and
a vehicle seat comprising:
a seat bottom having a front end and a rear end;
a seatback, with the rear end of the seat bottom positioned adjacent to the seatback, and with the seatback and the seat bottom being displaceable relative to one another; and
a seat positioning system comprising:
an actuator coupled to the seat bottom for displacing the seat bottom toward the seatback;
a position sensor for generating a seat position signal indicative of a position of one of the seat bottom and the seatback relative to the other of the seat bottom and the seatback; and a controller electrically coupled to the position sensor and the actuator, with the controller configured to:
compare the position to a position threshold in response to the controller receiving the seat position signal from the sensor; and
generate an activation signal in response to the controller determining that the position is above the position threshold and the controller receiving the running signal from the propulsion system;
wherein the actuator angularly displaces the seat bottom in response to the actuator receiving the activation signal from the controller;
wherein the seat positioning system further includes a door condition sensor for generating a door closed signal in response to an associated vehicle door being disposed in a closed position;
wherein the controller is electrically coupled to the door condition sensor and configured to generate the activation signal in further response to the controller receiving the door closed signal from the door condition sensor; and
wherein the actuator angularly displaces the front end of the seat bottom upward from a floor pan and toward the seatback in response to the actuator receiving the activation signal.

13. The motor vehicle of claim 12 wherein the vehicle seat further includes a seat belt having a webbing, a tongue carried by the webbing, and a buckle releasably fastened to the tongue;
wherein the seat positioning system further includes a seat belt sensor for generating a fastened signal in response to the seat belt sensor detecting that the buckle and tongue are engaged to one another;
wherein the controller is electrically coupled to the seat belt sensor, and the controller is configured to generate the activation signal in further response to the controller receiving the fastened signal from the seat belt sensor, and the actuator angularly displaces the front end of the seat bottom upward from the floor pan and toward the seatback in response to the actuator receiving the activation signal.

14. The motor vehicle of claim 13 wherein the propulsion system is configured to generate an inactive signal indicative of the motor vehicle being at least one of parked and turned off, and the controller is configured to not generate the activation signal in response to the controller receiving the inactive signal from the propulsion system.

15. A method for operating a vehicle seat for a motor vehicle, with the vehicle seat having a seatback and a seat bottom displaceable relative to one another, and the vehicle seat further including an actuator, a sensor, and a controller electrically coupled to the actuator and the sensor, the method comprising:
displacing at least one of the seat bottom and the seatback along at least one of an angular direction and a linear direction;
generating, using a position sensor, a seat position signal indicative of a position of one of the seat bottom and the seatback relative to the other of the seat bottom and the seatback;
comparing, using the controller, the position to a position threshold in response to the controller receiving the seat position signal from the position sensor;
generating, using the controller, an activation signal in response to determining that the position is above the position threshold; and
angularly displacing, using the actuator, the seat bottom in response to the actuator receiving the activation signal from the controller;
generating, using a door condition sensor of the seat positioning system, a door closed signal in response to an associated vehicle door being disposed in a closed position;
generating, using the controller electrically coupled to the door condition sensor, the activation signal in further response to the controller receiving the door closed signal from the door condition sensor; and
angularly displacing, using the actuator, a front end of the seat bottom upward from a floor pan and toward the seatback in response to the actuator receiving the activation signal.

16. The method of claim 15 further comprising:
generating, using a seat belt sensor, a fastened signal in response to the seat belt sensor detecting that a buckle and a tongue for the vehicle seat are engaged to one another;
generating, using the controller, the activation signal in further response to the controller receiving the fastened signal from the seat belt sensor; and
angularly displacing, using the actuator, a front end of the seat bottom upward from the floor pan and toward the seatback in response to the actuator receiving the activation signal.

17. The method of claim 16 further comprising:
generating, using a weight sensor, a load signal indicative of a load on the vehicle seat;
comparing, using the controller, the load to a load threshold in response to the controller receiving the load signal from the weight sensor; and
generating, using the controller, the activation signal in further response to the controller determining that the load is above the load threshold; and
angularly displacing, using the actuator, the front end of the seat bottom upward from the floor pan and toward the seatback in response to the actuator receiving the activation signal.

18. The method of claim 17 further comprising:
generating, using the seat belt sensor, an unfastened signal in response to the seat belt sensor detecting that a buckle and a tongue are disengaged from one another;
determining, using the controller, that the load is below the load threshold;
generating, using the door condition sensor, a door ajar signal in response to the associated vehicle door being disposed in an opened position; and
wherein the controller does not generate the activation signal in response to at least one of:
the controller receiving the unfastened signal from the seat belt sensor;
the controller determining that the load is below the load threshold;
the controller receiving the door ajar signal from the door condition sensor; and
the controller receiving an inactive signal from a propulsion system.

* * * * *